US006245118B1

(12) United States Patent
Shakhnovich

(10) Patent No.: US 6,245,118 B1
(45) Date of Patent: Jun. 12, 2001

(54) RESINOUS COMPOSITIONS CONTAINING BLUE DYE

(75) Inventor: Alexander Isaakovich Shakhnovich, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/394,215

(22) Filed: Sep. 10, 1999

(51) Int. Cl.⁷ .................................. D06P 5/00; D06P 1/20
(52) U.S. Cl. .......................... 8/506; 8/675; 8/552; 8/511; 8/514; 524/86; 525/437; 525/461; 528/176; 528/194; 528/288; 528/302; 528/308; 528/308.6; 528/422; 528/509
(58) Field of Search ............................. 8/675, 506, 552, 8/508–520, 922; 524/86; 525/437, 461; 528/176, 194, 288, 302, 308, 308.6, 422, 509

(56) References Cited

U.S. PATENT DOCUMENTS 3,203,751 * 8/1965 Hildreth .

FOREIGN PATENT DOCUMENTS 1906834    9/1969  (DE) .

* cited by examiner

*Primary Examiner*—Margaret Einsmann
(74) *Attorney, Agent, or Firm*—S. Bruce Brown; Noreen C. Johnson

(57) ABSTRACT

Resinous compositions, especially synthetic resins and most especially arylate polymers, contain 2,3-dicyano-1,4-diaminoanthraquinone as a blue dye. Said compositions are characterized by improved weatherability in comparison with compositions containing other blue dyes.

26 Claims, No Drawings

RESINOUS COMPOSITIONS CONTAINING BLUE DYE

BACKGROUND OF THE INVENTION

This invention relates to coloration of synthetic resins, and more particularly to the provision of weatherable resins which are blue in color.

With the ever-expanding areas of use of synthetic resins and especially thermoplastic resins, it is of increasing interest to produce resinous compositions having many types of surface appearance, including coloration. In particular, the production of resins which are blue in color is a concern.

Coloration of resins can be achieved by the use of dyes or pigments. One of the characteristics of pigments is their insolubility in the resin phase, which can lead to adverse consequences including loss of physical properties and loss of surface gloss. It is often preferred, therefore, to employ dyestuffs for coloration since they typically dissolve in the resin, forming a homogeneous composition which retains the gloss and advantageous physical properties characteristic of the neat resin.

The original industrial development of dyestuffs in the 19$^{th}$ century had as its goal the coloration of fabrics. It was necessary, therefore, to provide molecular features in the dyestuffs which maximized their adhesion to the fabric fibers. This often requires the presence of highly polar groups. For example, two commonly employed blue dyestuffs are Disperse Blue 60, or 1,4-diaminoanthraquinone-2,3-dicarboxylic acid N-(3-methoxypropyl)imide, and Amaplast Blue R3, or 1,4-bis(2,4,6-trimethylphenylamino) anthraquinone. The synthesis of such dyestuffs is complex and expensive. It would be desirable to develop blue dyestuffs having simpler molecular structures, not requiring as complicated a synthetic pathway.

Another factor of concern in the coloration of synthetic resins is weatherability. Many such resins undergo photo-yellowing and/or loss of gloss over time. For example, polycarbonates are often severely yellowed when exposed to outdoor conditions and particularly when exposed to ultraviolet (UV) light. The photoyellowing phenomenon is, naturally, accompanied by undesirable color change in a colored resin.

One way of protecting a resinous article against the effects of weathering is by the use of a weatherable polymer such as resorcinol isophthalate/terephthalate. Said weatherable polymer may be employed in bulk for the fabrication of the article. More often, however, it is used as a weatherability-improving additive or as the outer layer of a multilayer article. Alternatively, a copolymer comprising weatherability improving units may be produced; such copolymers are exemplified by block copolyestercarbonates containing 2,2-bis(4-hydroxyphenyl)propane (hereinafter sometimes "bisphenol A") carbonate blocks in combination with resorcinol isophthalate/terephthalate blocks.

It is of increasing interest, therefore, to produce resinous articles having a blue coloration. It is of further interest to produce such articles having a high degree of resistance to weathering and the color changes caused thereby.

SUMMARY OF THE INVENTION

The present invention is based on the discovery that a relatively simple anthraquinone-based compound, 2,3-dicyano-1,4-diaminoanthraquinone (hereinafter sometimes "DCAQ"), is a highly weatherable blue dyestuff suitable for use in synthetic resins. This is unexpected; DCAQ has long been used as an intermediate for dyestuffs such as Disperse Blue 60, but its capability of use as a dyestuff itself has not been recognized.

Accordingly, the invention includes compositions comprising the following and any reaction products thereof: (A) a major proportion of at least one resin and (B) a minor proportion, effective to impart a blue color to said resin, of DCAQ. In a preferred embodiment of the invention, the synthetic resin is a weatherable resin, especially a polyarylate comprising structural units derived from a 1,3-dihydroxybenzene organodicarboxylate.

DETAILED DESCRIPTION; PREFERRED EMBODIMENTS

For the sake of brevity, the constituents of the compositions of this invention are defined as "components" irrespective of whether a reaction between said constituents occurs at any time. Thus, the compositions may include said components and any reaction products thereof.

The compositions of this invention comprise a major proportion of at least one resin, hereinafter sometimes designated "base polymer". Suitable resins are of virtually any molecular structure and include natural and synthetic, thermosetting or thermoset and thermoplastic resins. Blends of any of such resins may also be employed.

Natural resins include cellulosic resins and rubber. Of the synthetic resins, which are often preferred, thermoset and thermosetting resins include those derived from epoxy compounds, cyanate esters, unsaturated polyesters, diallyl phthalate, acrylics, alkyds, phenol-formaldehyde (including novolaks and resoles), melamine-formaldehyde, urea-formaldehyde, bismaleimides, PMR resins, benzocyclobutanes, hydroxymethylfurans and isocyanates.

Thermoplastic resins include addition and condensation polymers. Condensation polymers are exemplified by polyesters, polyamides, polyethersulfones, polyetherketones, polyphenylene ethers, polyphenylene sulfides, polyimides and polyurethanes.

Illustrative addition polymers include homopolymers and copolymers of the following:

Esters of unsaturated alcohols, such as allyl and vinyl alcohols and butenediol, with saturated acids such as acetic, propionic, butyric, valeric, caproic and stearic; with unsaturated acids such as acrylic and methacrylic; with polybasic acids such as oxalic, succinic and adipic; with unsaturated polybasic acids such as maleic and fumaric; and with aromatic acids, e.g., benzoic, phthalic and terephthalic acids.

Esters of saturated alcohols, such as methyl, ethyl, propyl, isopropyl, butyl, isobutyl, sec-butyl, tert-butyl, 2-ethylhexyl and cyclohexyl alcohols, ethylene glycol and diethylene glycol, with unsaturated aliphatic monobasic and polybasic acids, examples of which appear above.

Vinyl cyclic compounds, including styrene, methylstyrenes, divinylbenzene, vinylpyridines and N-vinylpyrrolidinone.

Unsaturated ethers such as methyl vinyl ether.

Unsaturated ketones, e.g., methyl vinyl ketone and ethyl vinyl ketone.

Unsaturated amides, e.g., acrylamide, methacrylamide, N-methylacrylamide, diacetone acrylamide and 2-acrylamido-2-methylpropanesulfonic acid and salts thereof.

Unsaturated aliphatic hydrocarbons, for instance, ethylene, propylene, isobutene, butadiene, isoprene, 2-chlorobutadiene and α-olefins in general.

Vinyl halides, e.g., vinyl fluoride, vinylidene fluoride, vinyl chloride and vinylidene chloride.

Unsaturated acids, examples of which appear above.

Unsaturated acid anhydrides, e.g., maleic anhydride.

Unsaturated nitriles, e.g., acrylonitrile and methacrylonitrile.

The preferred addition polymers include homopolymers and copolymers, especially homopolymers of alkenylaromatic compounds, such as polystyrene, including syndiotactic polystyrene, and copolymers of alkenylaromatic compounds with ethylenically unsaturated nitriles, such as acrylonitrile and methacrylonitrile; dienes, such as butadiene and isoprene; and/or acrylic monomers, such as ethyl acrylate. These latter copolymers include the ABS (acrylonitrile-butadiene-styrene) and ASA (acrylonitrile-styrene-alkyl acrylate) copolymers.

The preferred base polymers under many conditions are polycarbonates (hereinafter sometimes designated "PC"), polyesters, polyetherimides, polyphenylene ethers and addition polymers. Related blends are disclosed in U.S. Pat. No. 6,143,839, the disclosure of which is incorporated by reference herein.

The polycarbonates in the blend compositions of the invention are most preferably bisphenol A homo- and copolycarbonates. Polyesters are illustrated by poly (alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate), poly (ethylene naphthalate), poly(butylene naphthalate), poly (cyclohexanedimethanol terephthalate), poly (cyclohexanedimethanol-co-ethylene terephthalate) and poly( 1,4-cyclohexanedimethyl-1,4-cyclohexanedicarboxylate), and especially poly(alkylene arenedioates), with PET and PBT being preferred.

Copolyestercarbonates may also be used. They comprise, in addition to the organic carbonate units, ester units such as isophthalate and/or terephthalate. The copolyestercarbonates which find use in the instant invention and the methods for their preparation are well known in the art as disclosed in, for example, U.S. Pat. Nos. 3,030,331, 3,169,121, 3,207, 814, 4,194,038, 4,156,069, 4,238,596, 4,238,597, 4,487,896 and 4,506,065.

Suitable base polymer blends may comprise miscible, immiscible and compatibilized blends including, but not limited to, PC/ABS, PC/ASA, PC/PBT, PC/PET, PC/polyetherimides, polyester/polyetherimide, polyphenylene ether/polystyrene, polyphenylene ether/polyamide and polyphenylene ether/polyester.

The blend compositions used as base polymers may be prepared by such conventional operations as solvent blending and melt blending. A particularly preferred method for blend preparation is melt blending such as by extrusion. The blends may additionally contain art-recognized additives including impact modifiers, UV screeners, flame retardants, fillers, stabilizers, flow aids, ester interchange inhibitors and mold release agents. It is intended that the blend compositions include simple physical blends and any reaction products thereof, as illustrated, for example, by polyester-polycarbonate transesterification products.

It has been found that DCAQ is a particularly advantageous blue dyestuff for weatherable base polymers. Suitable weatherable polymers include thermoplastic polyesters comprising structural units derived from a 1,3-dihydroxybenzene organodicarboxylate. Illustrative polymers of this type, specifically arylate polymers, are disclosed in commonly owned U.S. Pat. No. 6,143,839 the disclosure of which is incorporated by reference herein. Arylate polymers having a glass transition temperature of at least about 80° C. and no crystalline melting temperature, i.e., those that are amorphous, are preferred.

The arylate polymer is typically a 1,3-dihydroxybenzene isophthalate/terephthalate comprising structural units of the formula

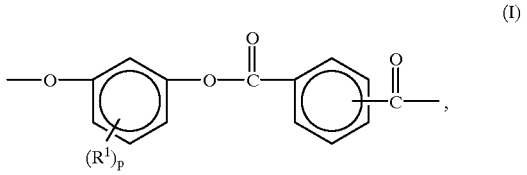

(I)

optionally in combination with structural units of the formula

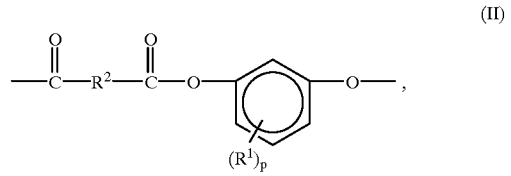

(II)

wherein each $R^1$ is a substituent, especially halo or $C_{1-12}$ alkyl, and p is 0–3; $R^2$ is a divalent $C_{3-20}$ aliphatic, alicyclic or mixed aliphatic-alicyclic radical and p is 0–3. Moieties represented by $R^2$ are often referred to as "soft block" units.

It is within the scope of the invention for other acid groups, such as those derived from aliphatic dicarboxylic acids such as succinic acid, adipic acid or cyclohexane-1, 4-dicarboxylic acid, or from other aromatic dicarboxylic acids such as 2,6-naphthalenedicarboxylic acid, to be present, preferably in amounts no greater than about 30 mole percent. Most often, however, the base polymer consists of units of formula I, optionally in combination with units of formula II.

The units of formula I contain a resorcinol or substituted resorcinol moiety in which any $R^1$ groups are preferably $C_{1-4}$ alkyl; i.e., methyl, ethyl, propyl or butyl. They are preferably primary or secondary groups, with methyl being more preferred. The most preferred moieties are resorcinol moieties, in which p is zero, although moieties in which p is 1 are also excellent with respect to the invention. Said resorcinol moieties are most often bound to isophthalate and/or terephthalate moieties.

Said 1,3-dihydroxybenzene moieties are bound to aromatic dicarboxylic acid moieties which may be monocyclic, e.g., isophthalate or terephthalate, or polycyclic, e.g., naphthalenedicarboxylate. Preferably, the aromatic dicarboxylic acid moieties are isophthalate and/or terephthalate. Either or both of said moieties may be present. For the most part, both are present in a molar ratio of isophthalate to terephthalate in the range of about 0.25–4.0:1, preferably about 0.4–2.5:1, more preferably about 0.67–1.5:1, and most preferably about 0.9–1.1:1.

In the optional soft block units of formula II, resorcinol or substituted resorcinol moieties are again present in ester-forming combination with $R^2$ which is a divalent $C_{3-20}$ aliphatic, alicyclic or mixed aliphatic-alicyclic radical.

Preferably, $R^2$ is a $C_{3-20}$ straight chain alkylene, $C_{3-12}$ branched alkylene, or $C_{4-12}$ cyclo- or bicycloalkylene group. More preferably, $R^2$ is aliphatic and especially $C_{8-12}$ straight chain aliphatic.

It is usually found that the arylate polymers most easily prepared, especially by interfacial methods, consist of units of formula II and especially combinations of resorcinol isophthalate and terephthalate units in a molar ratio in the range of about 0.25–4.0:1, preferably about 0.4–2.5:1, more preferably about 0.67–1.5:1, and most preferably about 0.9–1.1:1. When that is the case, the presence of soft block units of formula III is usually unnecessary. If the ratio of units of formula III is outside this range, and especially when they are exclusively iso- or terephthalate, the presence of soft block units may be preferred to facilitate interfacial preparation. A particularly preferred arylate polymer containing soft block units is one consisting of resorcinol isophthalate and resorcinol sebacate units in a molar ratio between 8.5:1.5 and 9.5:0.5.

Arylate polymers useful as the base polymer may be prepared by conventional esterification reactions which may be conducted interfacially, in solution, in the melt or under solid state conditions, all of which are known in the art. Typical interfacial preparation conditions are described in U.S. Pat. No. 5,916,997, the disclosure of which is incorporated by reference herein.

Also useful as the base polymer are the block copolyestercarbonates disclosed and claimed in copending, commonly owned application Ser. No. 09/181,902 (now abondoned), the disclosure of which is also incorporated by reference herein. They include block copolymers comprising moieties of the formula

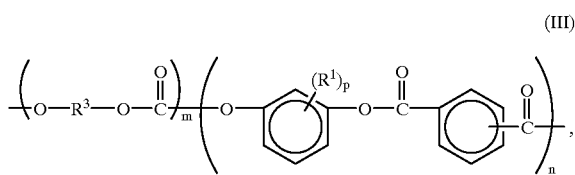

(III)

wherein $R^1$ and p are as previously defined, each $R^3$ is independently a divalent organic radical, m is at least about 10 and n is at least about 4. Soft block moieties corresponding to formula III may also be present. The most preferred moieties in the arylate blocks are again resorcinol moieties, in which p is zero.

In the organic carbonate blocks, each $R^3$ is independently a divalent organic radical. Preferably, said radical comprises at least one dihydroxy-substituted aromatic hydrocarbon, and at least about 60 percent of the total number of $R^3$ groups in the polymer are aromatic organic radicals and the balance thereof are aliphatic, alicyclic, or aromatic radicals. Suitable $R^3$ radicals include m-phenylene, p-phenylene, 4,4'-biphenylene, 4,4'-bi(3,5-dimethyl)-phenylene, 2,2-bis (4-phenylene)propane, 6,6'-(3,3,3',3'-tetramethyl-1,1'-spirobi[1H-indan]) and similar radicals such as those which correspond to the dihydroxy-substituted aromatic hydrocarbons disclosed by name or formula (generic or specific) in U.S. Pat. No. 4,217,438, which is incorporated herein by reference. A particularly preferred divalent organic radical is 2,2-bis(p-phenylene)isopropylidene and the dihydroxy-substituted aromatic hydrocarbon corresponding thereto is commonly known as bisphenol A.

The dyestuff employed according to the invention, to impart a blue color to the resin, is DCAQ. It has been found to have a strong and clean blue shade when incorporated in a resin. This is unexpected, since DCAQ, while a common intermediate for dyestuffs, does not itself have a color index number and thus apparently has not been considered useful per se as a dyestuff.

The proportion of DCAQ employed according to the invention is an amount effective to impart a blue color. This is generally an amount in the range of about 0.01–5.0% by weight based on total resin.

A major advantage of DCAQ as a dyestuff is its weatherability, which makes it particularly suitable for incorporation in weatherable resins. It has been found to produce an optical density after weathering which is substantially higher than that obtained with 1,4-bis(2,4,6-trimethylphenylamino)anthraquinone, a known blue dye.

The invention is illustrated by an example in which the resin employed was a block copolyestercarbonate containing 50 mole percent bisphenol A carbonate units and 50 mole percent resorcinol isophthalate/terephthalate units (50 mole percent isophthalate). A 150 gram (g) sample of the resin was mixed in a stainless steel blender with 150 milligrams (mg) of DCAQ. The mixture was dried overnight in an oven at 100° C., extruded in a twin screw extruder and compression molded into a film about 0.5 millimeters (mm) thick. The film, together with a control in which the dye was 1,4-bis(2,4,6-trimethylphenylamino)anthraquinone, was exposed in an accelerated xenon arc weathering test with water spray at 2.46 kiloJoules per square meter-hour (kJ/$m^2$-hr) and the absorbance at the wavelength of the visible maximum was measured. The results are given in the following table; the minimum value of optical density remaining which is considered acceptable is 90%.

| Sample | Example | Control |
| --- | --- | --- |
| Absorption maximum, nm | 638 | 633 |
| Optical density, 0 kJ | 1.843 | 1.762 |
| Optical density, 3850 kJ | 1.782 | 1.567 |
| Optical density, % remaining | 96.7 | 82.1 |

It is apparent that the composition of the invention (Example) is substantially more weatherable than the control, the latter being unacceptable from a color standpoint.

What is claimed is:

1. A composition comprising the following and any reaction products thereof:

(A) a major proportion of at least one resin selected from thermoset resins or thermoplastic resins, wherein the thermoplastic resin is selected from the group consisting of addition polymers, ABS, ASA, polycarbonates, polyetherimides, polyphenylene ethers, and polyarylates, and (B) a minor proportion, effective to impart a blue color to said resin, of 2,3-dicyano-1,4-diaminoanthraquinone.

2. The composition according to claim 1 wherein the polyarylate is a 1,3-dihydroxybenzene isophthalate/terephthalate comprising structural units of the formula

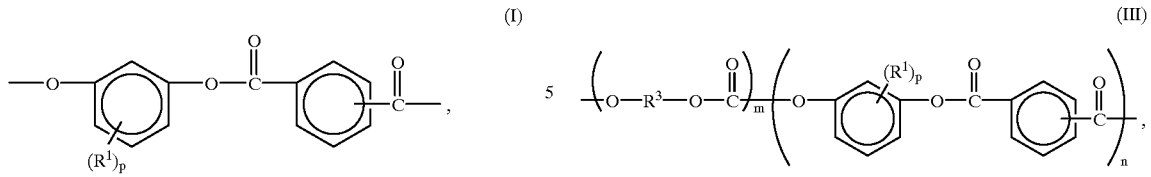

optionally in combination with structural units of the formula (II)

wherein each $R^1$ is a substituent, $R^2$ is a divalent $C_{3-20}$ aliphatic, alicyclic or mixed aliphtic-alicyclic radical and p is 0–3.

3. The composition according to claim 2 wherein component (A) consists of a polyarylate with structural units of formula I and p is zero.

4. The composition according to claim 3 wherein the structural units are mixed isophthalate/terephthalate units.

5. The composition according to claim 2 wherein component (A) consists of a polyarylate with structural units of formulas I and II, p is zero and $R^2$ is a $C_{8-12}$ straight chain aliphatic radical.

6. The composition according to claim 5 wherein the structural units of formula I are mixed isophthalate/terephthalate units.

7. The composition according to claim 1 wherein component (A) is a polyarylate block copolyestercarbonate comprising structural units of the formula

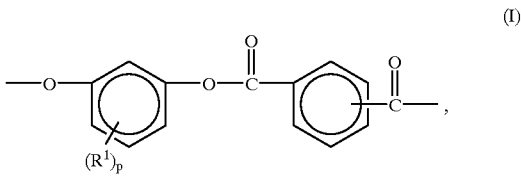

wherein each $R^1$ is a substituent, each $R^3$ is independently a divalent organic radical, m is at least about 10, n is at least about 4 and p is 0–3.

8. The composition according to claim 7 wherein p is zero and $R^3$ is 2,2-bis(p-phenylene)isopropylidene.

9. The composition according to claim 8 wherein the ester units are mixed isophthalate/terephthalate units.

10. The composition according to claim 1 wherein the amount of 2,3-dicyano-1,4-diaminoanthraquinone is in the range of about 0.01–5.0% by weight based on total resin.

11. A composition comprising the following and any reaction products thereof: a major proportion of at least one polyarylate comprising structural units derived from a resorcinol and a mixture of isophthalic and terephthalic acids, and about 0.01–5.0% by weight, based on said polyarylate, of 2,3-dicyano-1,4-diaminoanthraquinone.

12. The composition according to claim 11 wherein the polyarylate is a block copolyestercarbonate comprising structural units of the formula (III)

wherein each $R^1$ is a substituent, each $R^3$ is independently a divalent organic radical, m is at least about 10, n is at least about 4 and p is 0–3.

13. The composition according to claim 12 wherein p is zero and $R^3$ is 2,2-bis(p-phenylene)isopropylidene.

14. A method for preparing a composition comprising the following and any reaction products thereof: (A) a major proportion of at least one natural, synthetic, thermoset, or thermoplastic resin wherein the thermoplastic resin is selected from the group consisting of addition polymers, ABS, ASA, condensation polymers, polycarbonates, polyesters, polyetherimides, polyphenylene ethers, and polyarylate and (B) a minor proportion, effective to impart a blue color to said resin, of 2,3-dicyano-1,4-diaminoanthraquinone, wherein the method comprises melt blending components (A) and (B).

15. The method according to claim 14 wherein the component (A) is a polyarylate comprising 1,3-dihydroxybenzene isophthalate/terephthalate structural units of the formula

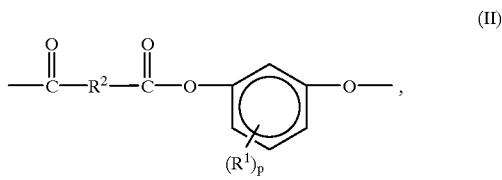

optionally in combination with structural units of the formula (II)

wherein each $R^1$ is a substituent, $R^2$ is a divalent $C_{3-20}$ aliphatic, alicyclic or mixed aliphatic-alicyclic radical and p is 0.3.

16. The method according to claim 15 wherein component (A) consists of a polyarylate with structural units of formula I and p is zero.

17. The method according to claim 16 wherein the structural units are mixed isophthalate/terephthalate units.

18. The method according to claim 15 wherein component (A) consists of a polyarylate with structural units of formulas I and II, p is zero and $R^2$ is a $C_{8-12}$ straight chain aliphatic radical.

19. The method according to claim 18 wherein the structural units of formula I are mixed isophthalate/terephthalate units.

20. The method according to claim 14 wherein component (A) is a polyarylate comprising block copolyestercarbonate structural units of the formula

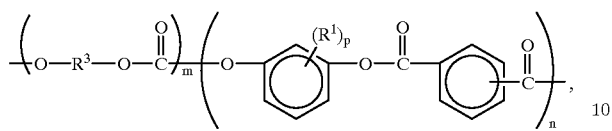

(III)

wherein each $R^1$ is a substituent, each $R^3$ is independently a divalent organic radical, m is at least about 10, n is at least about 4 and p is 0–3.

21. The method according to claim 20 wherein p is zero and $R^3$ is 2,2-bis(p-phenylene)isopropylidene.

22. The method according to claim 21 wherein the ester units are mixed isophthalate/terephthalate units.

23. The method according to claim 14 wherein the amount of 2,3-dicyano-1,4-diaminoanthraquinone is in the range of about 0.01–5.0% by weight based on total resin.

24. A method for preparing a composition comprising the following and any reaction products thereof: a major proportion of at least one polyarylate comprising structural units derived from a resorcinol and a mixture of isophthalic and terephthalic acids, and about 0.01–5.0% by weight, based on said arylate polymer, of 2,3-dicyano-1,4-diaminoanthraquinone, wherein the method comprises melt blending the arylate polymer and 2,3-dicyano-1,4-diaminoanthraquinone.

25. The method according to claim 24 wherein the polyarylate is a polyarylate block copolyestercarbonate comprising structural units of the formula

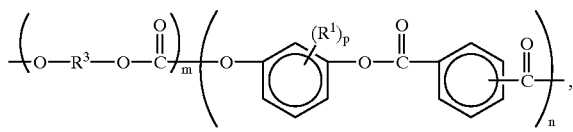

(III)

wherein each $R^1$ is a substituent, each $R^3$ is independently a divalent organic radical, m is at least about 10, n is at least about 4 and p is 0–3.

26. The method according to claim 25 wherein p is zero and $R^3$ is 2,2-bis(p-phenylene)isopropylidene.

* * * * *